(12) United States Patent
Kimmig

(10) Patent No.: US 7,156,467 B2
(45) Date of Patent: Jan. 2, 2007

(54) DEVICE AND METHOD TO CONTROL AND/OR REGULATE A PRESSURE LEVEL

(75) Inventor: Daniel Kimmig, Nesselried (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/949,795

(22) Filed: Sep. 24, 2004

(65) Prior Publication Data

US 2005/0082895 A1    Apr. 21, 2005

(30) Foreign Application Priority Data

Sep. 25, 2003   (DE)   ................................. 103 44 587

(51) Int. Cl.
*A47C 4/54* (2006.01)
*A47C 7/14* (2006.01)

(52) U.S. Cl. .............................. 297/452.41; 297/284.3; 297/284.6; 297/DIG. 6

(58) Field of Classification Search ........... 297/452.41, 297/DIG. 3, 284.6, 284.3
See application file for complete search history.

(56) References Cited

U.S. PATENT DOCUMENTS

| | | | | |
|---|---|---|---|---|
| 4,040,655 A | * | 8/1977 | Garrick et al. ..... 297/DIG. 3 X |
| 4,655,505 A | | 4/1987 | Kashiwamura et al. |
| 4,707,027 A | * | 11/1987 | Horvath et al. .......... 297/284.6 |
| 4,792,186 A | * | 12/1988 | Benjamin et al. ........ 297/284.6 |
| 4,966,410 A | * | 10/1990 | Bishai ................ 297/DIG. 3 X |
| 4,981,131 A | * | 1/1991 | Hazard ............... 297/DIG. 3 X |
| 5,152,579 A | * | 10/1992 | Bishai ................ 297/DIG. 3 X |
| 5,529,377 A | * | 6/1996 | Miller ...................... 297/284.6 |
| 5,628,547 A | * | 5/1997 | Matsumiya ........ 297/452.41 X |
| 5,634,685 A | * | 6/1997 | Herring ............. 297/452.41 X |
| 5,649,331 A | * | 7/1997 | Wilkinson et al. . 297/DIG. 3 X |
| 5,652,985 A | * | 8/1997 | Wilkinson et al. .. 297/452.41 X |
| 5,657,499 A | * | 8/1997 | Vaughn et al. ...... 297/452.41 X |
| 5,658,050 A | * | 8/1997 | Lorbiecki .............. 297/452.41 |
| 5,797,155 A | * | 8/1998 | Maier et al. ......... 297/452.41 X |
| 5,904,219 A | * | 5/1999 | Anahid et al. ..... 297/DIG. 3 X |
| 5,975,629 A | * | 11/1999 | Lorbiecki .......... 297/452.41 X |
| 6,036,271 A | * | 3/2000 | Wilkinson et al. ..... 297/452.41 |
| 6,098,000 A | * | 8/2000 | Long et al. .......... 297/284.6 X |
| 6,873,892 B1 | * | 3/2005 | Katz et al. ..................... 701/49 |

FOREIGN PATENT DOCUMENTS

| | | | |
|---|---|---|---|
| DE | 35 05 088 C1 | 11/1986 | |
| DE | 197 50 223 A1 | 6/1999 | |
| GB | 1257176 | 12/1971 | |
| JP | 60174334 | 9/1985 | |
| JP | 01124410 A | * 5/1989 | ............ 297/DIG. 3 |

* cited by examiner

*Primary Examiner*—Rodney B White
(74) *Attorney, Agent, or Firm*—Michael Best & Friedrich LLP

(57) ABSTRACT

A device to control and/or regulate the pressure level of at least one volume variable recipient (10, 12) of a pneumatic system, in particular a pneumatic system for a motor vehicle seat (14). Means (24, 26) make it possible to increase or reduce the pressure in the recipient (10, 12) in a reversible manner. In addition, a method to control and/or regulate the pressure level of at least one volume variable recipient (10, 12) of a pneumatic system, in particular a pneumatic system for a motor vehicle seat (14). The method varies the pressure level in the recipient (10, 12) by volume changes in a volume-adjusting element (24, 26) allocated to the recipient.

19 Claims, 1 Drawing Sheet

DEVICE AND METHOD TO CONTROL AND/OR REGULATE A PRESSURE LEVEL

BACKGROUND OF THE INVENTION

The invention starts with a device to control and/or regulate the pressure level of at least one volume variable recipient of a pneumatic system, in particular a pneumatic system for a seat of a motor vehicle. In addition, the invention relates to a method to control and/or regulate the pressure level of such a system.

Pneumatic control and/or regulating circuits are used in a variety of technical applications. Thus, these types of systems are used in the area of motor vehicle technology in order to increase the seating comfort of vehicle passengers, for example. In this connection, volume variable recipients, such as air cushions or bladders that are made preferably of synthetic material are embedded in the vehicle seat, and these recipients can be acted upon by a working fluid via a corresponding device in order to thereby adapt the vehicle seat to individual desires with regard to hardness and shape.

A pneumatically controlled seat for a motor vehicle, which makes it possible for the driver to vary the pressure distribution in the seat, is known from U.S. Pat. No. 4,655,505, for example. This device includes a plurality of flexible, i.e., volume variable, air chambers that are integrated into the seat of the vehicle, which are connected to an air pump and a pressure sensor via a corresponding number of connecting means. Each connecting means features a valve, which can be triggered via electronic control means that evaluate the signal from the pressure sensor.

The combined, pneumatic and electrical circuit of this device allows defined pressures to build up in the individual air chambers of the seat via the plurality of valves. It is possible in this way to increase both the comfort of the seat as well as to intercept the vehicle's longitudinal or lateral accelerations.

In particular, the device from U.S. Pat. No. 4,655,505 allows the pressure in each individual air chamber to be varied continuously time-wise by the opening and closing of the control valves so that an optimized pressure distribution can be adjusted. As a result, it is also possible to generate a massage effect in the seat's air chambers via an oscillating change in the pressure conditions.

In order to achieve the desired pressure conditions or the desired variation in the pressure conditions of the individual air chambers of the seat, an expensive electronic control and regulating unit with corresponding electronics and at least one pressure sensor and a central computing unit is required in the system of U.S. Pat. No. 4,655,505.

A motor vehicle seat with inflatable cushions embedded in the upholstery is known from DE 35 05 088 C1. In the system in DE 35 05 088 C1, a pump generates compressed air and feeds it to a line in which a pressure volume reservoir is inserted. The pressure that is generated by the pump and fed to the storage reservoir via the line is adjacent to a pressure-regulating device on the inlet side, while the air cushions are deaerated on the outlet side via allocated magnetic valves, and thus the pressure in the cushions can be reduced. The compressed air is then fed to a magnetic valve, which is a part of a pressure-regulating device. Pressure is regulated via a regulating pressure return, wherein this pressure is adjacent to four magnetic valves on the inlet side. The magnetic valves are triggered by a distribution device, which features a sliding valve. The magnetic valve is triggered in the sliding valve's first position in such a way that the side cushions as well as a cushion in the area of the headrest is filled. Depending upon the position of the sliding valve, additional air cushions can be filled in the area of the seat backrests. The individual air cushions in the vehicle seat of DE 35 05 088 C1 can be deaerated into the atmosphere via the four magnetic valves.

SUMMARY OF THE INVENTION

The device in accordance with the invention or the method in accordance with the invention has the advantage as compared with state of the art systems that control and/or regulation of the pressure level is possible without losses of the working fluid. In the case of state of the art systems, a pump fills a volume that is used as a working reservoir. The seating system is pneumatically liked to this volume in such a way that a filling of the air cushions of the seat takes place via the volume of a working fluid located in the intermediate reservoir. In this process, pressure sensors monitor the pressure of the air cushions. When the seat's air cushions are deaerated, the air is deflated, i.e., released to the atmosphere. For this reason, air always has to be re-fed to the system. This requires, among other things, a powerful and therefore both large as well as costly pump for the working fluid.

In the case of the system in accordance with the invention, no losses whatsoever of the working fluid occur in dynamic operation in an advantageous manner. Because of the means in accordance with the invention, it is possible to vary the volume connected with the recipients and thereby, since this is a closed system, automatically control the pressure in the recipients.

Because no losses of the working fluid occur in the proposed system, the system's pump can be restricted substantially in terms of its size. In addition, it is possible to dispense with a pressure accumulator in an advantageous manner so that the installation volume of the device in accordance with the invention is reduced considerably. Therefore, a completely self-sufficient system with a high savings in costs is the result. Such a system can be installed directly in a vehicle seat in an advantageous manner for example.

Advantageous developments and improvements of the device or the method in accordance with the invention that are disclosed in the independent claims are possible via the measures listed in the dependent claims.

In the case of the method in accordance with the invention, the pressure level in the recipients, which are integrated into a vehicle seat, for example, are varied by volume changes in a volume-adjusting element allocated to the recipient. In this way, it is possible in an essentially closed system to generate the desired pressure changes in the recipients. The use of a relatively large reservoir volume to replace the working fluid, which is discharged to the atmosphere in the case of state of the art systems when the pressure is reduced in the system, is not required with the system in accordance with the invention. This makes it possible to clearly reduce the installation size of the system in accordance with the invention.

At least one active volume-adjusting element, which makes it possible to vary the volume of the device in accordance with the invention being acted upon by a working fluid, is provided for in order to increase or reverse the pressure in the recipients of the device in accordance with the invention in a reversible manner. Since the quantity of the working fluid in the system is essentially kept constant, an increase in the volume being acted upon by the working fluid produces a pressure reduction in the recipients of the system. In the opposite case, if the volume being acted upon by the working fluid is reduced by the active volume adjusting element, this produces a pressure increase in the system and therefore in the recipients.

The device in accordance with the invention can feature, in an advantageous manner, a pump for the working fluid, for example a bi-pressure pump, which makes it possible to feed a static admission pressure to the system. The user of the system can use an operating switch to preset this static admission pressure in the recipients, which can be embodied, for example, in the form of volume variable air chambers made of a synthetic material. To do this, the active volume adjusting elements are positioned in a zero setting of their control range and then working fluid is pumped into the air cushions until the desired static pressure is reached. Since all subsequent pressure changes are generated by volume changes in the active volume adjusting elements, as a rule, there are no losses in the working fluid in the system. In other words, in the case of an active dynamic function (variation of the pressure in the recipients), from this time on, the pump must no longer feed any working means to the recipient. This allows a considerably smaller pump to be used so that it can also be installed directly in a vehicle seat in an advantageous manner, for example. The additional advantage of this is that linking the vehicle seat to the vehicle is limited to just the power supply and possible communication lines for the pneumatic system.

The volume of the active volume adjusting elements being acted upon by the working fluid is adjusted in an advantageous manner by an adjusting element, which is connected to a motor, particularly an electric motor. It is possible in this way to set the volume of the volume adjusting elements being acted upon by the working fluid, and thus the pressure in the corresponding, allocated recipients, in accordance with presetable signals.

The system in accordance with the invention makes it possible in an advantageous manner to detect the pressure conditions enclosed in the recipients through a measurement of the setting of the adjusting elements of the volume adjusting elements. Because the active volume adjusting elements have a defined volume and this volume is varied by a motor-driven adjusting element, the change in the position of the adjusting elements can be used to deduce the change in the volume of the volume adjusting elements being acted upon with working fluid. In this way, it is possible to determine the pressure in the associated recipients even without a pressure sensor. The pressure sensors that are customarily used to monitor the pressures in the air chambers of the pneumatic system can therefore be dispensed with, something which results in a clear cost savings since pressure sensors are very expensive and connecting them to the system is very costly.

The motor driving the adjusting elements is advantageously a motor with rotational direction reversal, which makes it possible in a simple way to both increase as well as decrease the volume of the volume adjusting elements being acted upon by a working fluid.

In an embodiment of the device in accordance with the invention, at least one sensor element can be provided which obtains information about the occupation of the vehicle seats and transmit this information to a control unit of the device. In this way, it is possible to activate only the seats that are in use in the respective situation.

The device in accordance with the invention allows a seat, in particular a seat for a motor vehicle, to be realized, which features all advantages of the dynamic pressure regulation, but requires a clearly reduced installation volume for this control and regulation system and results in a clear savings in costs.

In the case of the method to control and/or regulate the pressure level of at least one volume variable recipient of a pneumatic system, the pressure level in the recipient is varied by volume changes in a volume-adjusting element allocated to the recipient. An almost closed volume or pressure regulating system is possible in this way. The method in accordance with the invention makes the detection of the pressure level enclosed in the recipients possible in an advantageous manner without an expensive pressure sensor. The pressure level or the changes in the pressure level of the recipients can be detected in a simple manner via the regulating distance of the motor setting the adjusting element of the volume-adjusting element.

Additional advantages of the device in accordance with the invention or the method in accordance with the invention are yielded from the following description of an exemplary embodiment.

BRIEF DESCRIPTION OF THE DRAWINGS

An exemplary embodiment of the device in accordance with the invention is depicted in the drawing, which is supposed to be explained in greater detail in the following description. The FIGURE in the drawing, its description and the claims contain numerous features in combination. An expert will also observe these features individually and combine them into additional, meaningful combinations, which therefore shall also be viewed as having been disclosed in this text.

The drawing shows:

DETAILED DESCRIPTION

Figure 1:
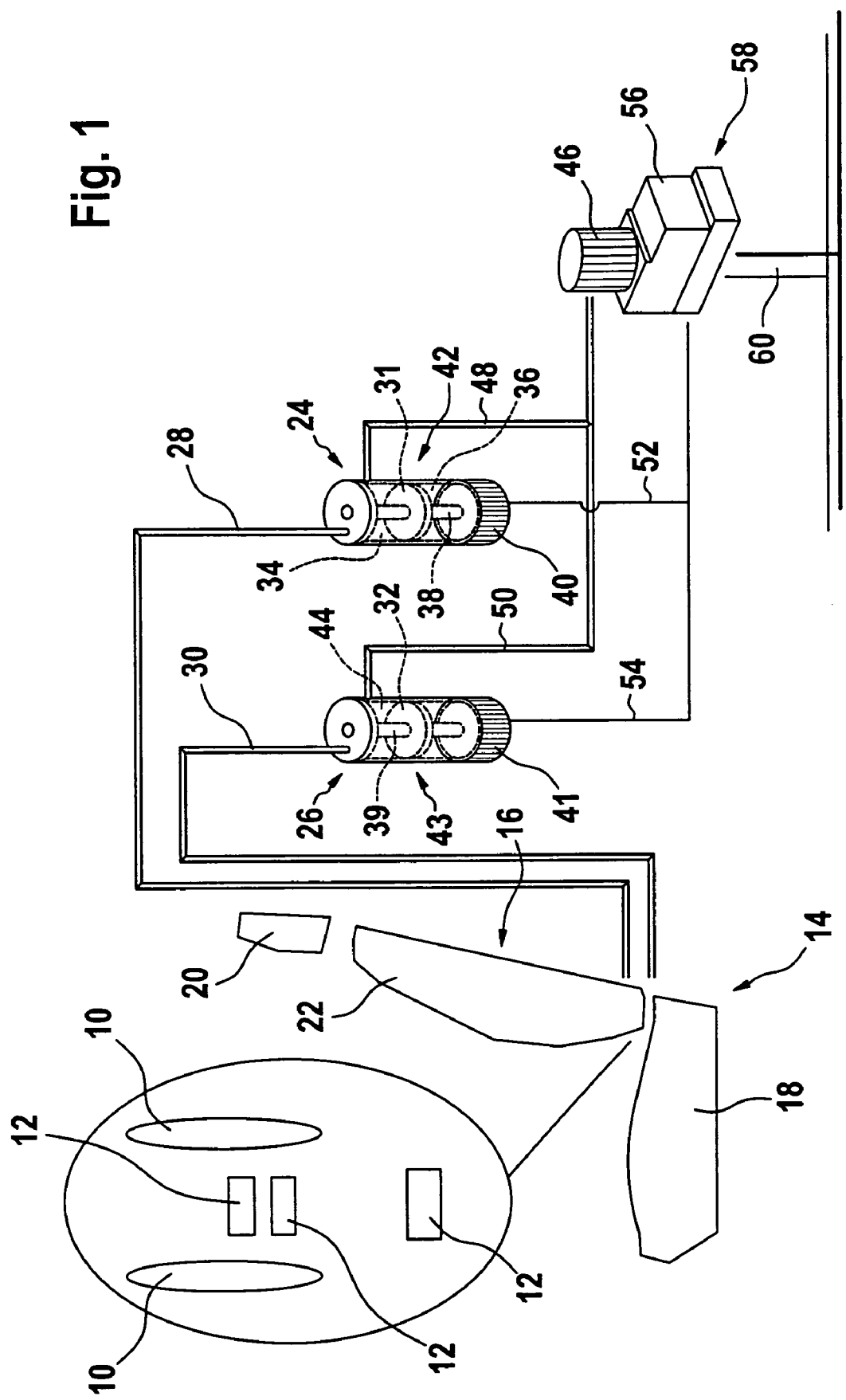
FIG. 1 A schematic overview drawing of an exemplary embodiment of the device in accordance with the invention to control and/or regulate the pressure level of at least one volume variable recipient.

The only FIGURE in the description shows an exemplary embodiment of the device in accordance with the invention to control and/or regulate the pressure level of at least one volume variable recipient. In the case of the exemplary embodiment depicted, a plurality of recipients in the form of inflatable air cushions 10 or 12 are integrated into a seat 14, which is a motor vehicle seat in the exemplary embodiment depicted. To simplify the depiction, the recipients are shown next to the actual seat and divided into only two groups 10 or 12, whose pressure level can be controlled or regulated separately from each another. Of course, in the case of the real system, the recipients or the air chambers are integrated into the seat. Exemplary embodiments of the device in accordance with the invention other than the one that is depicted can naturally include a different number of recipients as well as a different number of control devices without straying from the spirit of the invention.

The air cushions 10 are integrated into an area of the lateral support 22 of the backrest 16 of the vehicle seat 14, while the air cushions 12 are attached in the back area of the backrest 16 in the interior of the vehicle seat. Additional air cushions can be present for example in the seat area 18 or in the area of the headrest 20 of the seat.

By varying the pressure in the air cushions 10 or 12, the hardness and thus the comfort of the seat 14 can be adapted to the individual demands of its user. In addition, it is also possible to counteract a lateral acceleration of the vehicle via increased support of the vehicle passenger by increasing the pressure in one or both of the lateral areas 22 of the backrest 16, as is known from DE 197 50 233 C2, for example. As a result, the device in accordance with the invention enables the shape and the hardness of the seat to be statically adapted to its user as well as the seat contour to be set or reset in terms of driving dynamics, i.e., as a function of the driving situation.

In order for the air cushions 10 or 12 that are integrated into the seat 14 to be acted upon by a working fluid, which can be air, for example, the air cushions are each connected via connecting lines 28 or 30 to a volume adjusting element 24 or 26 allocated to the groups 10 or 12. The volume adjusting element 24 features a volume, for example, which is separated into two partial volumes 34 or 36 by a displaceable disk 31. The displaceable disk 31 is placed over a spindle 38, which is driven by an electric motor 40. The electric motor, the spindle as well as the disk 32 that can be displaced on the spindle are parts of an adjusting element 42 of the volume-adjusting element 24.

The first partial volume 34 of the volume-adjusting element 24 is acted upon by the working fluid. If a corresponding movement of the disk 31 reduces this partial volume 34, the pressure increases in the closed pneumatic system, which is formed by the partial volume 34, the connecting line 28 as well as the air cushions 12. In this way, it is possible to control or adjust the pressure in the air cushions and thus in the seat 14 via the active volume adjusting element 24.

The volume adjusting element 26, the connecting means 30 as well as the associated air cushions 10 also form a closed pneumatic system per se, whose pressure can be increased by reducing the partial volume 44 of the volume adjusting element 26 that is being acted upon by working fluid or correspondingly reduced by increasing the partial volume 44. The motor 41, the spindle 39 and the disk 32 driven by the spindle 39 are part of an adjusting element 43 of the volume-adjusting element 26. Otherwise, the structure of the volume-adjusting element 26 corresponds to the structure of the element 24.

In order to keep the response time of the pressure changes in the air chambers of the seat as low as possible, the pneumatic system features a static admission pressure or even several different static admission pressures. To do this, the disks 31 and 32 of the two volume adjusting elements 24 or 26 are put into a defined zero setting via the electric motors 40 or 41. A small feed pump, for example a bi-pressure pump 46, is used to feed a corresponding quantity of working fluid via the connecting lines 48 or 50, the partial volume 34 or 44 and the connecting lines 28 to 30 to the air cushions 12 or 10 until the desired static setting of the pressure level is reached. This setting of the static admission pressure in the air cushions of the seat can be set for example by the user via an operating switch or it can also already be preset at the factory.

The pressure in the air chambers 12 or 10 can be dynamically adjusted with a correspondingly short response time via the motors 40 or 41 by moving the disks 31 or 32 in such a way that the partial volumes 34 or 44 are increased or reduced. Advantageous in this case are electric motors that enable rotational direction reversal of their running direction and thus of the spindle 38 or 39 that drives the respective disk. Alternatively, control motors or an equivalent adjusting device can also set the partial volumes 34 or 44.

Since only the quantities of the partial volumes 34 or 44 of the volume-adjusting element 24 or 26 being acted upon by the working fluid are changed, no losses whatsoever of the work fluid occur. In other words, in the case of active dynamic function of the device in accordance with the invention, the pump 46 must no longer feed any working fluid to the recipient. This permits a pump with a considerably smaller size to be used, which in turn provides an opportunity to also install the pump directly in the seat 14. The connecting means 28, 30 or 48, 50 as well as the volume adjusting elements 24 or 26 depicted in the drawing can also be integrated directly into the seat 14 because of their low installation space and are shown outside the seat 14 in FIG. 1 only for the purpose of clarity. As a result, linking a vehicle seat to the vehicle is limited to just to a power supply and possible communication lines for the pneumatic system. This makes an almost self-sufficient pneumatic system possible with a clear reduction in assembly expense.

A control unit 56, which can be arranged for example in a structural unit 58 together with a control unit for the pump 46, triggers the motors 40 or 41 via corresponding signaling lines 52 or 54. The control units of the structural unit 58 can then enter into communication with a central control unit of the vehicle or other functions of the vehicle via a CAN bus 60.

At the same time, the system in accordance with the invention enables the detection of the pressure level present in the air chambers 10 or 12 in an advantageous manner without the expensive use of additional pressure sensors. By adjusting the path of the disks 31 or 32 in the Volume-adjusting elements 24 or 26, one can directly deduce the pressure change and therefore the pressure in the air chambers 10 or 12. A corresponding path adjustment of the disks can be detected easily in the case of a stepper motor, for example. In the case of the exemplary embodiment shown in the FIGURE, which uses spindles 38 or 39 for the path adjustment of the disks 31 or 32, the rotating rate of the motor 40 or 41 can be determined in a simple manner via a Hall sensor and therefore the path adjustment of the disks via the spindle increase and the associated-volume change and be made available for vehicle monitoring via the control unit 56 and the CAN bus 60. As a result, separate pressure sensors to monitor the pressure level in the air chambers 10 or 12 can be eliminated, something which produces a clear savings in costs in the case of the system in accordance with the invention.

The device in accordance with the invention or the method in accordance with the invention to control and/or regulate the pressure level of at least one volume variable recipient of a pneumatic system, in particular a pneumatic system for a motor vehicle seat, in which the pressure level in the recipient is varied by volume changes in a volume adjusting element allocated to the respective recipient, is not limited to the exemplary embodiment depicted in the drawing.

In particular, the device and method are not limited to the use in a seat of a motor vehicle.

In addition, the device is not limited to the use of the number of air cushions, volume adjusting elements or other components of the system depicted in the exemplary embodiment.

The invention claimed is:

1. A device for controlling and/or regulating the pressure level of at least one volume variable recipient of a motor vehicle seat pneumatic system having a static admission pressure, the device comprising a closed system communicating with the recipient so that the closed system and the recipient contain a working fluid, the closed system including a volume adjusting element adjusted to a defined zero setting, the volume adjusting element operably increasing or reducing the pressure in the recipient in a reversible manner by selectively decreasing and increasing the volume of the closed system, the system having an inlet with a pump that feeds a corresponding quantity of working fluid to the volume adjusting element and achieving initial static pressurization of the working fluid prior to active dynamic pressurization of the system, the dynamic pressurization increased or decreased with no losses in working fluid and the pump no longer feeding any working fluid to the recipient.

2. A device according to claim 1, characterized in that the volume adjusting element includes a motor which drives an adjusting element, which sets the volume of the volume adjusting element in accordance with pre-settable signals.

3. A device according to claim 2, characterized in that the motor of the adjusting element is a motor with rotational direction reversal.

4. A device according to claim 2 wherein the motor is an electric motor.

5. A device according to claim 1, characterized in that the pressure in the recipient is determined from the setting of the adjusting element of the volume adjusting element.

6. A device according to claim 1, characterized in that at least one volume-adjusting element is arranged in an allocated vehicle seat.

7. A device according to claim 1 characterized in that the pump is arranged in a vehicle seat.

8. A device according to claim 1, characterized in that at least one sensor element is provided, which obtains information about the occupation of the seat and transmits this information to a control unit for the device.

9. A method to control and/or regulate the pressure level of at least one volume variable recipient of a motor vehicle seat pneumatic system having a static admission pressure, the method comprising providing a closed system employing a working fluid communicating with the recipient, the closed system including a volume adjusting element adjusted to define a zero setting, the volume adjusting element operably varying the pressure level in the recipient by increasing and decreasing the volume of the working fluid of the closed system, the system having an inlet with a pump that feeds a corresponding quantity of working fluid to the volume adjusting element and achieving initial static pressurization of the working fluid prior to active dynamic pressurization of the system, the dynamic pressurization increased or decreased with no losses in working fluid and the pump no longer feeding any working fluid to the recipient.

10. A method according to claim 9, characterized in that the pressure level that is present in the recipient is detected via the setting of at least one volume-adjusting element that is allocated to the recipient.

11. A method according to claim 9, characterized in that the pressure level that is present in the recipient is detected via the regulating distance of a motor setting an adjusting element of the volume-adjusting element.

12. A seat for a motor vehicle, the seat comprising at least one volume variable recipient of a pneumatic system having a static admission pressure, and a device for controlling and/or regulating the pressure level of the recipient, the device comprising a closed system communicating with the recipient so that the closed system and the recipient contain a working fluid, the closed system including a volume adjusting element adjusted to a defined zero setting, the volume adjusting element operably increasing or reducing the pressure in the recipient in a reversible manner by selectively decreasing and increasing the volume of the closed system, the system having an inlet with a pump that feeds a corresponding quantity of working fluid to the volume adjusting element and achieving initial static pressurization of the working fluid prior to active dynamic pressurization of the system, the dynamic pressurization increased or decreased with no losses in working fluid and the pump no longer feeding any working fluid to the recipient.

13. A seat according to claim 12, characterized in that the volume adjusting element includes a motor which drives an adjusting element, which sets the volume of the volume adjusting element in accordance with pre-settable signals.

14. A seat according to claim 13, characterized in that the motor of the adjusting element is a motor with rotational direction reversal.

15. A seat according to claim 13 wherein the motor is an electric motor.

16. A seat according to claim 12, characterized in that the pressure in the recipient is determined from the setting of the adjusting element of the volume adjusting element.

17. A seat according to claim 12 characterized in that the volume-adjusting element is located in the seat.

18. A device according to claim 12, characterized in that the pump is located in the seat.

19. A device according to claim 12, characterized in that at least one sensor element is provided, which obtains information about the occupation of the scat and transmits this information to a control unit for the device.

* * * * *